(12) United States Patent
Lee et al.

(10) Patent No.: US 9,141,963 B2
(45) Date of Patent: Sep. 22, 2015

(54) SYSTEM AND METHOD FOR PROVIDING ADVERTISEMENT TO WIRELESS NETWORK SERVICE USER

(75) Inventors: Keon Su Lee, Seongnam-si (KR); Choong Hee Lee, Seoul (KR); Il Gu Lee, Seongnam-si (KR); Yung Seong Lee, Seongnam-si (KR); Kyung Hoon Kim, Seongnam-si (KR); Hye Jin Kang, Seongnam-si (KR)

(73) Assignee: NAVER Corporation, Seongnam-si (KR)

(*) Notice: Subject to any disclaimer, the term of this patent is extended or adjusted under 35 U.S.C. 154(b) by 566 days.

(21) Appl. No.: 13/152,030

(22) Filed: Jun. 2, 2011

(65) Prior Publication Data

US 2011/0302033 A1 Dec. 8, 2011

(30) Foreign Application Priority Data

Jun. 4, 2010 (KR) .................. 10-2010-0053011

(51) Int. Cl.
G06Q 30/00 (2012.01)
G06Q 30/02 (2012.01)
(52) U.S. Cl.
CPC ............ *G06Q 30/02* (2013.01); *G06Q 30/0259* (2013.01); *G06Q 30/0261* (2013.01); *G06Q 30/0277* (2013.01)

(58) Field of Classification Search
USPC ....................................... 705/14.64
See application file for complete search history.

(56) References Cited

U.S. PATENT DOCUMENTS

| 2005/0130112 | A1* | 6/2005 | Lotvin et al. | 434/323 |
| 2006/0253869 | A1* | 11/2006 | Boyer et al. | 725/51 |
| 2010/0263022 | A1* | 10/2010 | Wynn et al. | 726/3 |
| 2011/0258049 | A1* | 10/2011 | Ramer et al. | 705/14.66 |

FOREIGN PATENT DOCUMENTS

JP 2008167019 A * 7/2008

* cited by examiner

*Primary Examiner* — James A Reagan
(74) *Attorney, Agent, or Firm* — Greer Burns & Crain Ltd.

(57) ABSTRACT

Provided are a system and method for providing a wireless network service to a user terminal free of charge, by providing a doorway page for exposing an advertisement on the user terminal provided with the wireless network service through an access point. Accordingly, the user terminal may be provided with the wireless network service free of charge, other than the cost of viewing the advertisement exposed on the doorway page. An advertiser and a proprietor may expose the advertisement at the cost of providing the free wireless network service.

11 Claims, 6 Drawing Sheets

SYSTEM AND METHOD FOR PROVIDING ADVERTISEMENT TO WIRELESS NETWORK SERVICE USER

CROSS-REFERENCE TO RELATED APPLICATION

This application claims priority from and the benefit of Korean Patent Application No. 10-2010-0053011, filed on Jun. 4, 2010, which is hereby incorporated by reference for all purposes as if fully set forth herein.

BACKGROUND OF THE INVENTION

1. Field of the Invention

Exemplary embodiments of the present invention relate to a system and method for providing an advertisement to a user connecting to a wireless network.

2. Discussion of the Background

Recently, as terminals capable of connecting to a wireless network (Wi-Fi) are more widely distributed, users of wireless networks are increasing. Correspondingly, business proprietors who adopt an access point for connection to wireless networks are increasing.

In order to use the wireless network, the users need to connect to an access point by subscribing for a dedicated service. However, since the dedicated service demands an additional cost, the users prefer not to use the access point. Accordingly, efficient distribution of the wireless network service becomes difficult.

Additionally, the business proprietor adopting the access point demands an effective method to publicize their places of business. Moreover, in a case that the business proprietor adopting the access point is a public organization or a well-known company, advertisers located around the access point also need a method for exposing their respective advertisements.

SUMMARY OF THE INVENTION

Exemplary embodiments of the present invention provide a method and system for providing a wireless network service free of charge to a user terminal, by providing the user terminal with at least one of a doorway page and a search page exposing an advertisement when the user terminal requests connection to a wireless network through an access point of the wireless network.

Exemplary embodiments of the present invention also provide a method and system that provide the user terminal with at least one of a doorway page and a search page that exposes an advertisement and thereby provide an advertising opportunity through at least one of the doorway page and the search page, corresponding to a wireless network service provided to a user terminal, to a proprietor who supports an access point, an advertiser located around the access point, and an advertiser who wants to provide an advertisement targeting a user who connects to a wireless network through at least one access point identified by a predetermined standard.

Exemplary embodiments of the present invention also provide a method and system capable of increasing an advertising efficiency by providing a user with various services related to a location of an access point of a wireless network.

Additional features of the invention will be set forth in the description which follows, and in part will be apparent from the description, or may be learned by practice of the invention.

An exemplary embodiment of the present invention discloses a network service providing system including a connection request receiving unit to receive a wireless network connection request from a user terminal through an access point of a wireless network, a page providing unit to provide the user terminal with at least one of a doorway page and a search page exposing an advertisement, the doorway page and the search page related to the wireless network connection, in accordance with the wireless network connection request, and a network service providing unit to approve the wireless network connection request from the user terminal provided with at least one of the doorway page and the search page, and to provide the user terminal with a wireless network service.

Another exemplary embodiment of the present invention discloses an advertisement management system including an advertisement registering unit to register an advertisement to be exposed on at least one of a doorway page and a search page related to a connection of a user terminal to a wireless network through an access point of the wireless network, and an advertisement providing unit to provide the registered advertisement to a network service providing system.

Another exemplary embodiment of the present invention discloses a network service providing method further including receiving a wireless network connection request from a user terminal through an access point of a wireless network, providing the user terminal with at least one of a doorway page and a search page exposing an advertisement, and the doorway page and the search page related to the wireless network connection, in accordance with the wireless network connection request, and providing the user terminal with a wireless network service by approving the wireless network connection request from the user terminal provided with at least one of the doorway page and the search page.

Another exemplary embodiment of the present invention discloses an advertisement management method including registering an advertisement to be exposed on at least one of a doorway page and a search page related to a connection of a user terminal to a wireless network through an access point of the wireless network, and providing the registered advertisement to a network service providing system, wherein the network service providing system exposes an advertisement on at least one of the doorway page and the search page, thereby providing at least one of the doorway page and the search page to the user terminal transmitting a wireless network connection request.

It is to be understood that both the foregoing general description and the following detailed description are exemplary and explanatory and are intended to provide further explanation of the invention as claimed.

EFFECT OF THE INVENTION

According to embodiments of the present invention, when a user terminal requests connection to a wireless network through an access point of the wireless network, at least one of a doorway page and a search page exposing an advertisement is provided to the user terminal, accordingly providing the user terminal with the wireless network service.

According to embodiments of the present invention, corresponding to a wireless network service provided to a user terminal, a method and system provide an advertising opportunity through at least one of a doorway page and a search page, by providing the user terminal with at least one of the doorway page and the search page exposing an advertisement, to a proprietor who supports an access point, an advertiser located around the access point, and an advertiser who wants to provide an advertisement targeting a user who connects to a wireless network through at least one access point identified by a predetermined standard.

Also, according to embodiments of the present invention, an advertising efficiency may be increased by providing a user with various services related to a position of an access point of a wireless network.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
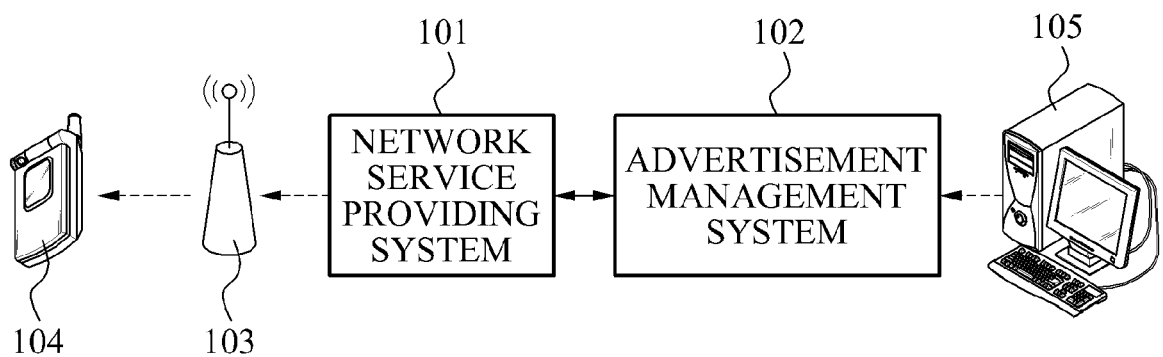
FIG. 1 is a diagram illustrating a process of exposing an advertisement through a user terminal, according to an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity and like reference numerals in the drawings denote like elements.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed in the following could be termed a second element, component, region, layer or section without departing from the teachings of the present invention.

The terminology used herein is for the purpose of describing exemplary embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

Hereinafter, exemplary embodiments of the present invention will be described in detail with reference to the accompanying drawings.

FIG. 1 is a diagram illustrating a process of exposing an advertisement through a user terminal, according to an embodiment of the present invention.

FIG. 1 shows a network service providing system 101, an advertisement management system 102, an access point 103, a user terminal 104, and an advertiser terminal 105.

First, a system and a terminal related to provision of an advertisement to a wireless internet connection user will be described.

(1) Network Service Providing System 101

The network service providing system 101 refers to a system that provides a wireless network service to the user terminal 104 through the access point 103 of a wireless network. The network service providing system 101 may be operated by an Internet service provider (ISP) supplying the wireless network service.

(2) Access Point 103

The access point 103 refers to a network device enabling the user terminal 104 to connect to the wireless network. According to the present embodiment, the access point 103 may refer to a device supporting communication technologies IEEE 802.11a, b, g which are also called Wi-Fi. However, the communication technology type supported by the access point 103 is not specifically limited.

The access point 103 may be operated directly by the ISP operating the network service providing system 101. The access point 103 may be under the management of an operator of a location where the access point 103 is installed. Hereinafter, the operator will be denoted as a proprietor who subscribes to a service of a network operator and manages the access point 103. However, the meaning of the proprietor is not limited to a commercial business operator.

The access point 103 may be installed in a business place of a proprietor or in a means of transportation.

(3) User Terminal 104

The user terminal 104 refers to a terminal that connects to the wireless network provided by the network service providing system 101 of the network operator through the access point 103. The user terminal 104 may include various wireless terminals capable of connecting to the wireless network, such as a mobile phone, a smart phone, and a laptop computer.

(4) Advertisement Management System 102

The advertisement management system 102 refers to a system that manages an advertisement to be provided to a user who connects to the Internet through the access point 103. The advertisement management system 102 may be operated by a network operator who operates the network service providing system 101 or by a separate advertisement platform operator.

The advertisement management system 102 may perform registering, providing, charging, and the like, related to the advertisement to be provided to the user. For this purpose, the advertisement management system 102 may exchange information with the advertiser terminal 105 and the network service providing system 101.

The advertisement management system 102 may manage the advertisement in accordance with a request of the advertiser terminal 105. The advertisement, thus registered, may be provided in accordance with a request of the network service providing system 101.

The advertisement management system 102 may provide necessary information so that the network service providing system 101 provides a page containing the advertisement. As it depends on each case, the advertisement management system 102 may directly transmit the page containing the advertisement to the user terminal 104.

(5) Advertiser Terminal 105

The advertiser terminal 105 refers to a terminal used for the advertiser who provides an advertisement to the user through the user terminal 104, to register and manage the advertisement.

The advertiser terminal 105 may connect to the advertisement management system 102 and input information necessary for providing of the advertisement. For example, creative of the advertisement, information on budget, information on advertisement providing conditions may be input.

The information on advertisement providing conditions may include information to set an advertisement target related to users who connect to the network through access points belonging to a group satisfying a predetermined standard, for example, a group of access points related to a particular location or particular business operator.

Hereinafter, an advertisement providing process will be described in detail.

The user terminal 104 may be provided with the wireless network service of the network service providing system 101 through the access point 103 located nearby. The user terminal 104 may transmit a wireless network connection request to the network service providing system 101 through the access point 103.

In accordance with the request, the network service providing system 101 may provide the user terminal 104 with a doorway page for connection to the wireless network. That is, the doorway page may denote a starting page for the user terminal 104 to pass through so as to be provided with the wireless network service.

According to an embodiment, the doorway page provided to the user terminal 104 may contain an advertisement. The advertisement management system 102 may be relevant to the providing of the advertisement.

The advertisement provided to the user of the access point 103 may be provided through not only the doorway page that the user terminal 104 passes through at the beginning of connection to the Internet but also an advertisement inventory occupying a partial area of a search page provided to the user terminal 104 while the Internet service is being supplied to the user terminal 104 through the access point 103. Consequently, when the user terminal 104 requests connection to the wireless network through the access point 103 of the wireless network at least one of the doorway page and the search page is provided to the user terminal 104, thereby providing the wireless network service to the user terminal 104.

The advertisement exposed on at least one of the doorway page and the search page may include advertisements related to various advertisers as follows.

A. Advertisement of Proprietor Related to Access Point

According to an embodiment of the present invention, the advertisement exposed on at least one of the doorway page and the search page may be an advertisement of a proprietor who manages the access point 103. For example, with respect to a user connecting to the Internet through the access point 103 installed in a business place such as a theater and a restaurant, an advertisement related to the proprietor of the business place may be provided.

When dedicated location checking information is available, such as position information of a global positioning system (GPS) or information acquired by an entry checking system, different advertisements may be provided to users making an access through the same access point. For example, advertisements to be provided to users inside a theater and outside the theater may be differentiated.

Also, when information for differentiating a customer who used a service of the proprietor from a customer who does not use the service is available, that is information on purchase is available, the advertisements may also be differentiated.

B. Advertisement of Sponsor Supporting Network Connection Cost

Under the condition of supporting costs for the Internet access, the advertiser may expose his or her advertisement to the user who connects the Internet through a corresponding access point.

The proprietor related to the location where the corresponding access point is installed or related to a path of the access point may perform advertising more effectively by targeting the user of the corresponding access point.

C. Other Advertisers

Advertisers of the advertisement with respect to the users of the access point are not limited to the two aforementioned types.

Figure 2:
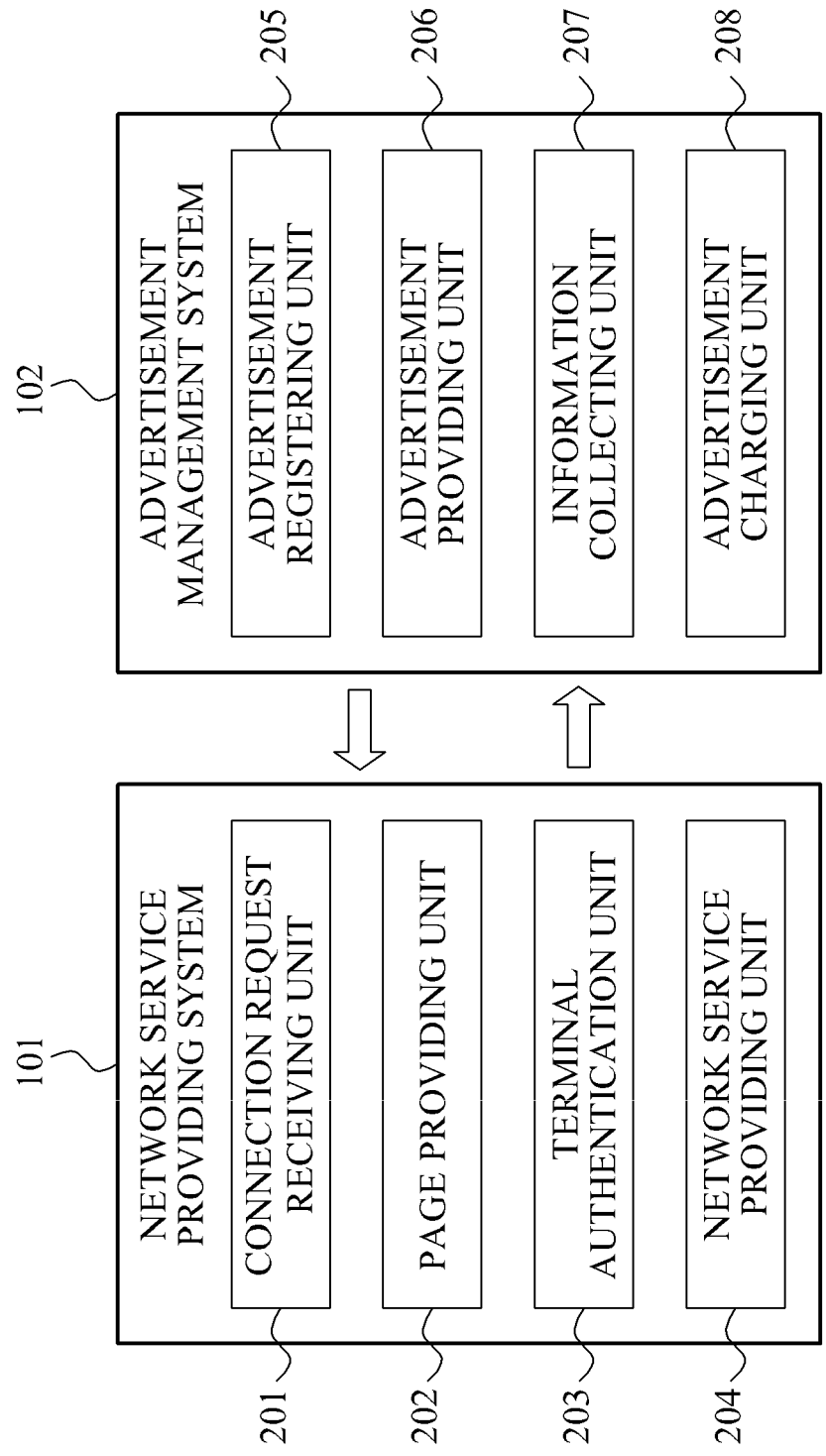
FIG. 2 is a diagram illustrating a detailed structure of a network service providing system and an advertisement management system, according to an embodiment of the present invention.

FIG. 2 is a diagram illustrating a detailed structure of a network service providing system 101 and an advertisement management system 102, according to an embodiment of the present invention.

First, an operation of the network service providing system 101 will be described with reference to FIG. 2. The network service providing system 101 may include a connection request receiving unit 201, a page providing unit 202, a terminal authentication unit 203, and a network service providing unit 204.

The connection request receiving unit 201 may receive a wireless network connection request of a user terminal through an access point of a wireless network. The access point according to an embodiment may be installed in a business place of a proprietor or in a means of transportation.

When the access point is installed in the business place of the proprietor, the connection request receiving unit 201 may approve the wireless network connection request from the user terminal located in the business place of the proprietor. Additionally, when the access point is installed in the means of transportation including a car, a train, a subway, and the like, the connection request receiving unit 201 may approve the wireless network connection request from the user terminal located in the means of transportation.

A message informing that an access to the Internet is available through the access point 103 may be transmitted to the user terminal located around the access point 103. That is, push notification that induces connection to the corresponding access point 103 may be provided to the user terminal located in or around the business place where the access point 103 is installed. In the same manner, the push notification may be provided to the user terminal located in the means of transportation where the access point 103 is installed.

For example, when a mobile phone able to communicate with the access point 103 is found, a text message informing that an access point free to be used is available may be transmitted to a corresponding user terminal.

The page providing unit 202 may provide the user terminal with the doorway page related to connection to the wireless network, in accordance with the wireless network connection request. Here, the advertisement may be exposed through a partial area of the doorway page. In addition, the page providing unit 202 may provide a search page while the user terminal is being provided with Internet service through the access point 103. Here, the advertisement may be exposed through a partial area of the search page.

For example, the page providing unit 202 may provide at least one of the doorway page and the search page containing an advertisement registered in relation to an access point group corresponding to a certain business place. For this purpose, the advertisement management system 102 may manage information on the access point and register an advertisement in units of the access point group. More specifically, when access points AP1, AP2, and AP3 are installed in the business place of the proprietor, the advertisement management system 102 may register an advertisement with respect to a first access point group that includes the access points AP1, AP2, and AP3. When the means of transportation is a subway and different access points are installed in different subway cars, the advertisement management system 102 may register an advertisement with respect to a second access point group that includes the access points installed in the respective subway cars.

As another example, the advertisement registered with the advertisement management system 102 according to installation locations of the access points may be provided to the user terminal through at least one of the doorway page and the search page.

For example, the advertisement management system 102 may register and manage an advertisement according to a district unit, for example Gangnam-gu, or a ward unit, for example Apgujeong-dong, where the access point is installed. In other words, when the wireless network connection request from the user terminal is received through the access point belonging to a specific district or ward, at least one of the doorway page and the search page containing the advertisement registered with the corresponding district or ward may be provided to the user terminal.

Also, the advertisement management system 102 may register and manage an advertisement according to a unit of point of interest (POI) where the access point is installed. For example, when the wireless network connection request is received from the user terminal located in or around a movie theater YY in a region XX, an advertisement registered with the movie theater YY may be provided to the user terminal, being exposed on at least one of the doorway page and the search page. Here, the POI may be a business place of a proprietor who owns the access point. In this case, the registered advertisement may belong to the proprietor or an advertiser located around the business place of the proprietor.

Additionally, the advertisement management system 102 may register an advertisement in units of the means of transportation where the access point is installed, such as a bus, a taxi, a subway, a train, an airplane, and the like. For example, when the wireless network connection request is received from the user terminal located in a subway car travelling on a line number 2, an advertisement registered with the subway car travelling on the line number 2 may be provided to the user terminal, being exposed on at least one of the doorway page and the search page. Here, the registered advertisement may belong to an advertiser located in a place related to a path of the means of transportation.

The advertisement related to the proprietor of the business place where the access point is installed may be exposed on at least one of the doorway page and the search page. In addition, millage information related to a visit to the business place may also be provided to the user terminal of a user who has visited the business place including the access point one or more times, through at least one of the doorway page and the search page. Here, the millage information may include information on a discount according to frequency of visits or a free-of-charge service of the business place according to the frequency of visits.

The advertisement may be exposed on at least one of the doorway page and the search page, considering whether the wireless network connection request is received within business hours of the proprietor, whether the user terminal is located within the business place, and whether the user terminal is located around a plurality of proprietors.

More specifically, when the wireless network connection request is received within the business hours and the user terminal is located within the business place, an advertisement guiding use of the business place of the proprietor or an advertisement inducing a repeat visit to the business place may be exposed. The advertisement inducing a repeat visit may contain discount information, promotion event information, and coupon information. When the wireless network connection request is received out of the business hours and the user terminal is located out of the business place, an advertisement guiding business hours of the business place or an advertisement inducing a visit to the business place during the business hours may be exposed. Furthermore, when a plurality of proprietors are located around the user terminal, advertisements of the plurality of proprietors may be exposed simultaneously or alternately on at least one of the doorway page and the search page.

An advertisement of the advertiser located around the business place where the access point is installed may be exposed on at least one of the doorway page and the search page. In this case, the advertisement of the advertiser may be at least one advertisement allocated with a right to be exposed on at least one of the doorway page and the search page. The right to be exposed may be determined in order of registration or according to bidding of an advertisement related to the business place.

Also, an advertisement of the advertiser located around the path of the means of transportation where the access point is installed may be exposed on at least one of the doorway page and the search page. The at least one of the doorway page and the search page may include a search area to receive a search keyword from the user terminal.

For example, when the search keyword is received from the user terminal, the advertisement of the advertiser belonging to the POI related to the search keyword among predetermined POIs around the path of the means of transportation may be exposed on at least one of the doorway page and the search page. Here, the path of the means of transportation may include a bus service route, a subway route, a train route, and the like.

As another example, when the search keyword related to the predetermined POI is received from the user terminal, the advertisement of the advertiser located around a path from the means of transportation to the POI may be exposed on at least one of the doorway page and the search page. Here, the path from the means of transportation to the POI may refer to a path from a boarding point or a disembarking point of the user with respect to the means of transportation to the POI.

As still another example, when a boarding and disembarking station on the path is selected by the user terminal, an advertisement of an advertiser related to local information of the boarding and disembarking station may be exposed on at least one of the doorway page and the search page. For example, when the wireless network connection request is received from the user terminal of a user on board a subway car travelling on the line number 2 through the access point of the wireless network installed in the corresponding subway car, the page providing unit 202 may display a map of the subway line number 2 on at least one of the doorway page and the search page. Additionally, when a station ZZ on the map is selected by the user terminal, an advertisement of an advertiser located around the station ZZ may be exposed on at least one of the doorway page and the search page. Also, at least one of the doorway page and the search page which contains exit information, transfer traffic information, main facilities nearby, and the like about the station ZZ, may be provided.

According to an embodiment, when the user terminal visits the search page by passing through the doorway page, the advertisement may be exposed on the search page. That is, while the user terminal is being provided with the wireless network service through the access point, the advertisement may be exposed on the search page displaying on the user terminal. Here, the advertisement may be displayed on a partial area of the page or exposed on the search page repeatedly for a predetermined period.

Additionally, regardless of whether the user terminal passes through the doorway page, the advertisement may be exposed on the search page being displayed on the user terminal while the user terminal is being provided with the wireless network service through the access point. That is, even without the doorway page, the wireless network service may be provided free of charge to the user terminal receiving the advertisement through the partial area of the search page.

Although the page providing unit 202 has been described as a part of the network service providing system 101, the page providing unit 202 may be configured as a part of the advertisement management system 102. In this case, the configuration may be modified so as to correspond to structures of the network service providing system 101 and the advertisement management unit 102.

As described in the foregoing, provision of the advertisement may be achieved by providing information on the user terminal and the access point as an advertisement providing parameter to the advertisement management system 102 when the page providing unit 202 provides at least one of the doorway page and the search page, and by providing a proper advertisement utilizing the information by the advertisement management system 102.

Here, information used as the targeting standard of the advertisement in relation to provision of the advertisement may not be information on the access point group. That is, an advertisement sold with respect to a predetermined keyword may be selected by a predetermined matching process.

The terminal authentication unit 203 may authenticate the user terminal using at least one of the doorway page and the search page. The authentication operation will be described in detail with reference to FIG. 4.

The network service providing unit 204 may approve the wireless network connection request of the user terminal provided with at least one of the doorway page and the search page, thereby providing the wireless network service to the user terminal. Here, the network service providing unit 204 may provide the wireless network service to an authenticated user terminal.

Hereinafter, an operation of the advertisement management system 102 will be described. Referring to FIG. 2, the advertisement management system 102 may include an advertisement registering unit 205, an advertisement providing unit 206, an information collecting unit 207, and an advertisement charging unit 208.

The advertisement registering unit 205 may register an advertisement to be exposed on at least one of the doorway page and the search page related to connection of the user terminal to the wireless network through the access point of the wireless network.

For example, the advertisement registering unit 205 may register the advertisement of the advertiser located around the business place where the access point is installed. Here, the advertisement registering unit 205 may register the advertisement in units of the access point group. Furthermore, the advertisement registering unit 205 may register the advertisement according to a location where the access point is installed. That is, bidding the advertisement of the advertiser is performed in units of the access point group or the installation location of the access point. The installation location of the access point may be one of the predetermined POIs.

As another example, the advertisement registering unit 205 may register the advertisement related to the proprietor of the business place where the access point is installed.

As still another example, the advertisement registering unit 205 may register the advertisement of the advertiser located around the path of the means of transportation where the access point is installed.

The advertisement registering unit 205 may register the advertisement related to the proprietor of the business place where the access point is installed.

However, the advertisement management unit 206 does not perform only targeting of the advertisement in units of access point but may also sell the advertisement in units of keyword. In a case of the keyword advertising, an additional process of matching an advertisement target keyword to the access point or to the user terminal is necessary.

The advertisement providing unit 206 may provide the registered advertisement to the network service providing system 101. Accordingly, the network service providing system 101 may expose the advertisement on at least one of the doorway page and the search page, thereby providing the advertisement to the user terminal transmitting the wireless network connection request.

The registered advertisement may be an advertisement related to the proprietor of the business place where the access point is installed. Also, the registered advertisement may be an advertisement of the advertiser located around the path of the means of transportation where the access point is installed.

For example, when the advertisement related to the proprietor of the business place where the access point is installed is registered, the advertisement providing unit 206 may provide the advertisement considering whether the wireless network connection request is received within the business hours, whether the user terminal is located in the business place, and whether the user terminal is located around a plurality of proprietors.

At least one of the doorway page and the search page may include the search area for receiving the search keyword from the user terminal. Therefore, the advertisement providing unit 206 may provide the advertisement of the advertiser located in the POI related to the search keyword among the predetermined POIs located around the path of the means of transportation. Further, when the search keyword is related to the predetermined POI, the advertisement providing unit 206 may provide the advertisement of the advertiser located around the path from the means of transportation to the POI.

The information collecting unit 207 may collect advertisement information in relation to the advertisement exposed through at least one of the doorway page and the search page. The collected advertisement information may be used as bidding information for registration of the advertisement or as charge information for an advertisement charge.

For example, the information collecting unit 207 may collect, from the proprietor who owns the access point, at least one of business type information of the proprietor, identification (ID) information of the access point, geographical information of the access point, and an advertiser range for exposure of the advertisement. Here, the ID information may include a service set identifier (SSID) of the access point, a personal ID number (PIN), or a media access control (MAC) address. The advertiser range may refer to a type of the advertiser related to the advertisement exposed on at least one of the doorway page and the search page. The proprietor may limit the advertiser related to the advertisement exposed on at least one of the doorway page and the search page, by setting the advertiser range. The geographical information of the access point refers to a geographical coordinate of the access point, and may include an address of the access point, a global positioning system (GPS) information, or latitude and longitude information.

As another example, the information collecting unit 207 may collect at least one of a desired region for advertisement exposure, a desired proprietor for advertisement exposure, a unit price of an advertisement, and an advertising method, from an advertiser who intends to expose the advertisement through at least one of the doorway page and the search page. Here, the desired region for advertisement exposure refers to an installation region of the access point to expose the advertisement of the advertiser. The desired region for advertisement exposure may be set according to any one of a district unit, a ward unit, and a POI unit. The desired proprietor for advertisement exposure may be a proprietor of a business place to expose the advertisement of the advertiser. The unit price of the advertisement refers to an advertising cost caused by exposure of the advertisement when the advertisement is registered by bidding. The advertising method may include an image type, a text type, and a motion picture type.

The advertisement charging unit 208 may impose a charge in relation to the advertisement exposed on the user terminal provided with the wireless network service through at least one of the doorway page and the search page. For example, the advertisement charging unit 208 may impose a fixed amount of charge according to a contract period. Also, the advertisement charging unit 208 may perform the charging according to a cost per milleimpression (CPM), a number of users provided with the wireless network service, an action of the users after the advertisement exposure, and the like.

According to the embodiment of the present invention, at least one of the doorway page and the search page may expose various services related to the access point, other than the advertisement.

(a) At least one of the doorway page and the search page may expose information that the user terminal is connected to the wireless network and simultaneously checked via an online service operated by the advertisement management system 102. Here, the exposed information may be varied by a user.

(b) Contents of an advertisement exposed on at least one of the doorway page and the search page may be associated with contents of an advertisement exposed through the online service by the advertisement management system 102.

(c) A pattern may be collected regarding a visit of a user to a business place of a proprietor, where the access point is installed, and then to a business place of another proprietor. Therefore, at least one of the doorway page and the search page may expose a recommended guide service regarding the business place of another proprietor.

(d) A map indicating a geographical location of the access point may be exposed on at least one of the doorway page and the search page.

(e) At least one of the doorway page and the search page may expose statistical data of connection to the access point, evaluation information regarding the business place where the access point is installed, representative services and commodities, and the like.

(f) Documents made by users connected to the wireless network through the access point corresponding to the information of the business place of the proprietor, may be exposed.

(g) Records of connection to the wireless network through the access point may be collected so that a keyword recommendation service may be exposed accordingly.

(h) Records of connection to the wireless network through the access point may be collected so that a business place visit history or a means of transportation boarding history may be exposed accordingly.

Figure 3:
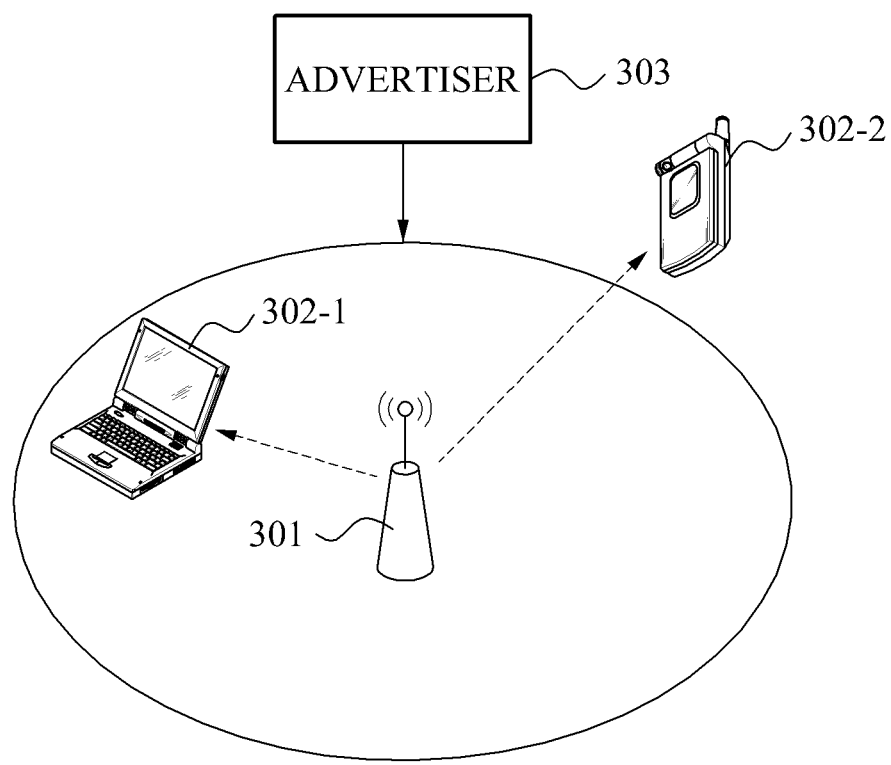
FIG. 3 is a diagram illustrating a process of exposing an advertisement when a user is provided with a wireless network service through an access point, according to an embodiment of the present invention.

FIG. 3 is a diagram illustrating a process of exposing an advertisement when a user is provided with a wireless network service through an access point, according to an embodiment of the present invention.

A user terminal 302-1 is located in a business place of a proprietor or a means of transportation where an access point 301 is installed. A user terminal 302-2 is located out of the business place of the proprietor, where the access point 301 is installed. A circle in FIG. 3 denotes a business place region or a means of transportation region.

When a wireless network connection request is transmitted from the user terminal 302-1 located in the business place or the means of transportation to the access point 301, the network service providing system 101 may provide the user terminal 302-1 with at least one of a doorway page and a search page. At least one of the doorway page and the search page may expose any of an advertisement of the proprietor, an advertisement of an advertiser 303 located around the business place of the proprietor, and an advertisement of the advertiser 303 around a path of the means of transportation.

Although located out of the business place, if within a predetermined radius from the business place, the user terminal 302-2 may be provided with the wireless network service through the access point 301. In this case, the network service providing system 101 may provide at least one of the doorway page and the search page to the user terminal 302-2. Here, at least one of the doorway page and the search page may expose the advertisement of the proprietor or the advertisement of the advertiser 303 located around the business place of the proprietor.

In case of exposing the advertisement of the proprietor, the advertisement may be exposed in different manners according to whether the wireless network connection request is received within the business hours of the proprietor or not. Also, when the advertisement of the proprietor is exposed, the advertisement may be exposed in different manners according to whether the user terminal 302-1 is located within the business place of the proprietor or whether the user terminal 302-1 is located around a plurality of proprietors. For example, when the wireless network connection request is received within business hours and the user terminal 302-1 is located within the business place, the user terminal 302-1 may be provided with an advertisement providing use of the business place of the proprietor or an advertisement inducing a revisit of the user to the business place, through at least one of the doorway page and the search page. When the wireless network connection request is received within business hours and the user terminal 302-1 is located out of the business place, the user terminal 302-1 may be provided with the advertisement inducing a visit of the proprietor to the business place, through at least one of the doorway page and the search page. When the wireless network connection request is received out of business hours and the user terminal 302-1 is located out of the business place, the user terminal 302-1 may be provided with an advertisement providing business hours of the business place or an advertisement inducing a visit to the business place during business hours, through at least one of the doorway page and the search page. Furthermore, when the user terminal 302-1 is located around a plurality of proprietors, the user terminal 302-1 may be provided with advertisements of the plurality of proprietors simultaneously or alternately, through at least one of the doorway page and the search page.

The user terminals 302-1 and 302-2 may view the advertisement through at least one of the doorway page and the search page and, at the cost of viewing the advertisement, may be provided with the wireless network service by the network service providing system 101. The advertisement is exposed generally on the doorway page. However, when the advertisement is moved from the doorway page to the search page through the user terminals 302-1 and 302-2, the search page may expose the advertisement. For example, the advertisement may be exposed directly on a partial area of the search page or forcibly on the search page every predetermined time. Regardless of whether the user terminals pass through the doorway page, the advertisement may be exposed on the partial area of the search page and as such the wireless network service may be provided free of charge.

Hereinafter, the doorway page will be described in detail.

Figure 4:
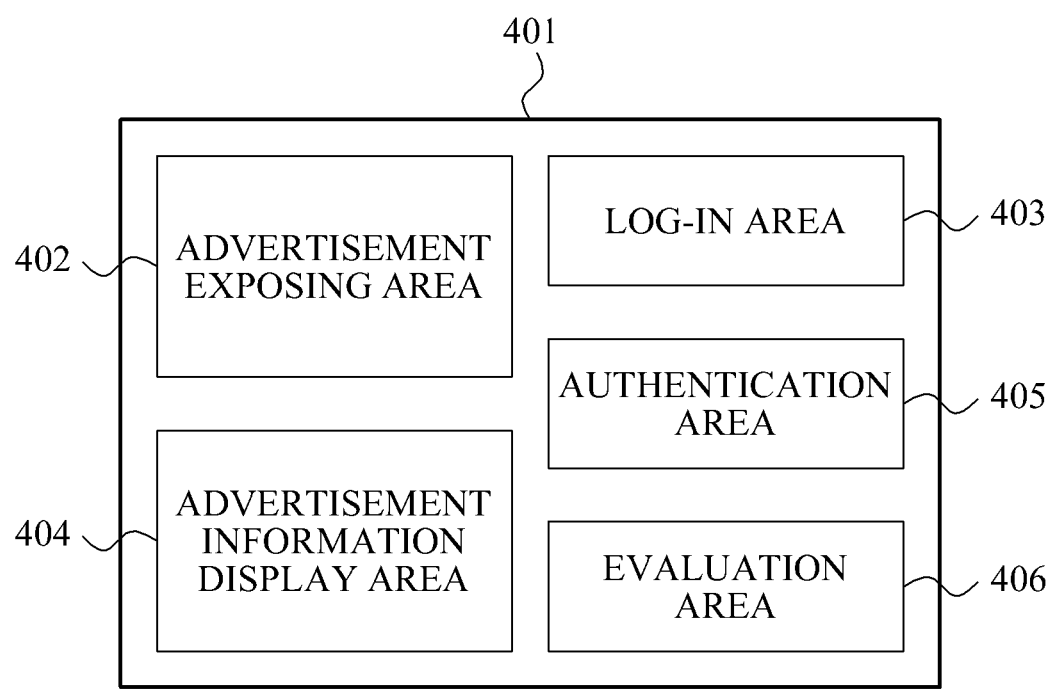
FIG. 4 is a diagram illustrating a doorway page according to an embodiment of the present invention.

FIG. 4 is a diagram illustrating a doorway page 401 according to an embodiment of the present invention.

Referring to FIG. 4, the doorway page 401 includes an advertisement exposing area 402, a log-in area 403, an advertisement information display area 404, an authentication area 405, and an evaluation area 406.

The advertisement information display area 404 may display advertisement information related to the business place of the proprietor. For example, the advertisement information may include an introductory address of the proprietor, a publicity image of the business place, details of the business place, event information of the business place, a membership card production information of the business place, poll information for users, and the like.

As another example, the advertisement exposing area 402 may expose the advertisement of the advertiser located around the business place, through the user terminal of a user visiting the business place of the proprietor. The advertisement exposing area 402 may expose the advertisement of the advertiser located around a path of the means of transportation. That is, while the proprietor provides the user with an opportunity of being provided with the wireless network service through the access point, correspondingly, the advertiser may have an opportunity of exposing an advertisement on the doorway page 401. Therefore, the advertisement information display area 404 may display the advertisement information related to the advertiser.

The log-in area 403 may receive, from the user terminal, log-in information for connection to a service related to the advertisement management system 102. In this manner, the advertisement management system 102 may collect information on the user.

The authentication unit 405 may be input with authentication information of the user terminal to provide the wireless network service to the user terminal.

For example, authentication of the user terminal may be performed as follows.

(1) Authentication Using a PIN Code

As a PIN code is input from the user terminal to the authentication area 405 of the doorway page 401, authentication of the user terminal is performed. Here, the proprietor may change the PIN code every predetermined period. Consequently, when a user who has visited, once before, the business place of the proprietor wants to be provided with the wireless network service without directly visiting the business place, the user would simply need to input the changed PIN code around the business place.

The PIN code may be exposed in the form of offline prints such as a poster, a menu board, and a brochure or exposed through a display device installed in the business place or the means of transportation, to the user who is visiting the business place of the proprietor or on board the means of transportation. Also, the PIN code may be exposed through a free service or fortune information provided by the business place of the proprietor. When the user terminal is capable of reading a quick response (QR) code or barcode marked in the business place of the proprietor, the PIN code may be exposed as the user terminal scans the QR code or barcode. Here, the QR code denotes a matrix type 2-dimensional (2D) barcode indicating information by a black-and-white grid pattern.

(2) Authentication Using MAC Address

The proprietor owning the access point may authenticate the user terminal using a MAC address of the user terminal and the ID information of the user. The user terminal having a MAC address that is already once approved may be automatically authenticated afterward by agreement of the proprietor.

(3) Authentication Using PBC

According to a push button configuration (PBC) method, when a virtual button or actual button is pushed by the proprietor owning the access point and the user owning the user terminal, simultaneously, authentication of the user terminal is achieved.

Although the doorway page has been explained by way of example with reference to FIG. 4, the partial area of the search page may be configured in the same manner as in FIG. 4.

Figure 5:
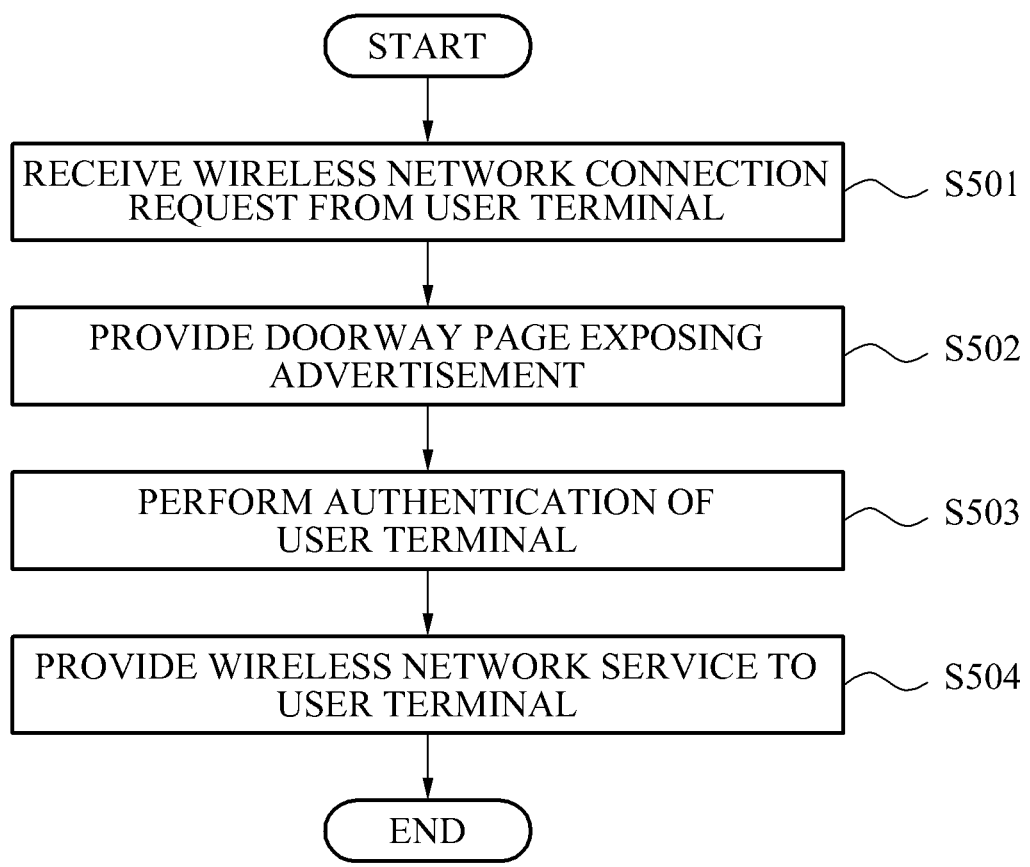
FIG. 5 is a flowchart illustrating a network service providing method according to an embodiment of the present invention.

FIG. 5 is a flowchart illustrating a network service providing method according to an embodiment of the present invention.

In operation S501, the network service providing system 101 may receive the wireless network connection request from the user terminal through the access point of the wireless network. Here, the network service providing system 101 may send out the push notification for an access to the doorway page to the user terminal located around the access point.

In operation S502, in response to the wireless network connection request, the network service providing system 101 may expose an advertisement on the doorway page related to connection to the wireless network and provide the user with the advertisement.

For example, the network service providing system 101 may expose, on the doorway page, the advertisement related to the proprietor of the business place where the access point is installed. Here, the network service providing system 101 may expose the advertisement considering whether the wireless network connection request is received within business hours of the proprietor, whether the user terminal is located within the business place, and whether the user terminal is located around a plurality of proprietors.

As another example, the network service providing system 101 may expose the advertisement of the advertiser located around the business place where the access point is installed, on the doorway page. Here, the network service providing system 101 may expose the advertisement registered with the advertisement management system 102 in units of the access point group, thereby providing the advertisement to the user terminal. In addition, the network service providing system 101 may expose the advertisement registered with the advertisement management system 102 on the doorway page according to the installation location of the access point, thereby providing the advertisement to the user terminal.

As still another example, the network service providing system 101 may expose the advertisement of the advertiser located around the path of the means of transportation where the access point is exposed, on the doorway page.

Here, the doorway page may contain the search area to receive the search keyword from the user terminal. Therefore, the network service providing system 101 may expose the advertisement of the advertiser located in a POI related to the search keyword among predetermined POIs located around the path of the means of transportation. In addition, when the search keyword is related to a predetermined POI, the network service providing system 101 may provide the advertisement of the advertiser located around the path from the means of transportation to the predetermined POI.

The network service providing system 101 may expose the advertisement on the search page when the user terminal visits the search page passing through the doorway page.

In operation S503, the network service providing system 101 may authenticate the user terminal using the doorway page.

In operation S504, the network service providing system 101 may approve the wireless network connection request of the user terminal provided with the doorway page, and thereby provide the user terminal with the wireless network service.

Figure 6:
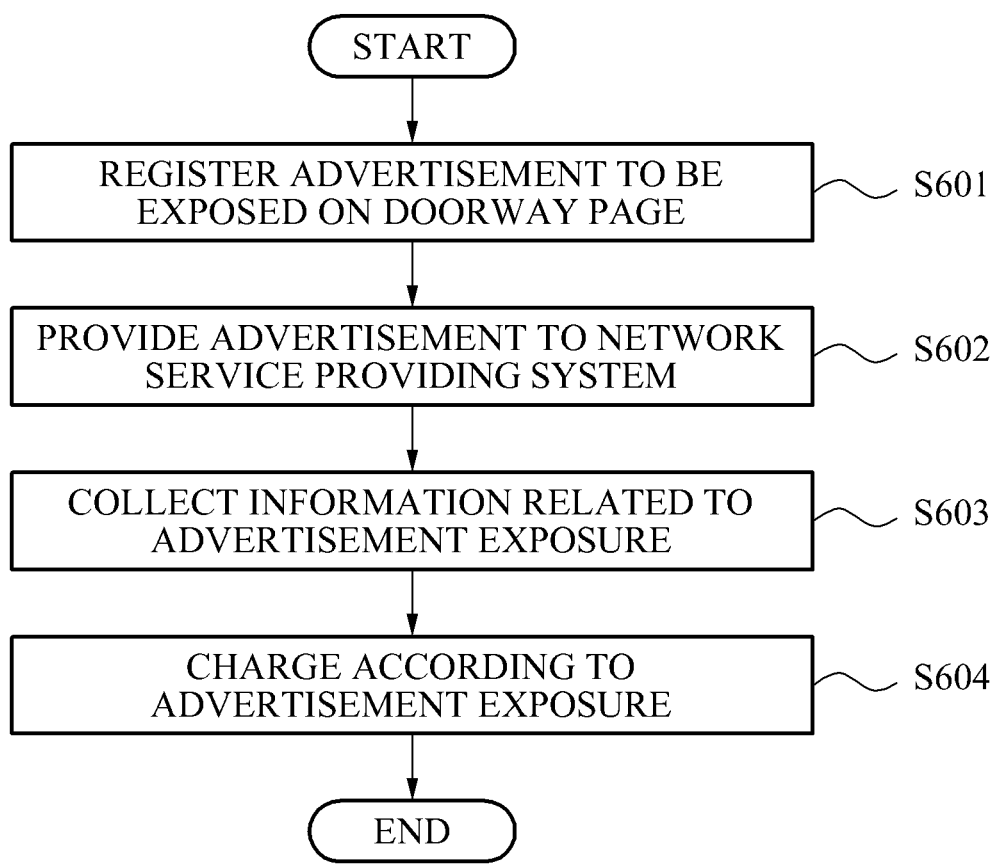
FIG. 6 is a flowchart illustrating an advertisement management method according to an embodiment of the present invention.

FIG. 6 is a flowchart illustrating an advertisement management method according to an embodiment of the present invention.

In operation S601, the advertisement management system 102 may register an advertisement to be exposed on the doorway page related connection of the user terminal to the wireless network through the access point of the wireless network.

For example, the advertisement management system 102 may register the advertisement of the advertiser located around the business place where the access point is installed. Here, the advertisement management system 102 may register the advertisement in units of the access point group. Also, the advertisement management system 102 may register the advertisement according to the installation location of the access point.

As another example, the advertisement management system 102 may register the advertisement related to the proprietor of the business place where the access point is installed.

As still another example, the advertisement management system 102 may register the advertisement of the advertiser located around the path of the means of transportation where the access point is installed.

In operation S602, the advertisement management system 102 may provide the registered advertisement to the network service providing system 101. Here, the network service providing system 101 may provide the advertisement to the user terminal transmitting the wireless network connection request, by exposing the advertisement on the doorway page.

When the advertisement related to the proprietor of the business place where the access point is installed is registered, the advertisement management system 102 may provide the advertisement considering whether the wireless network connection request is received within business hours, whether the user terminal is located within the business place, and whether the user terminal is located around a plurality of proprietors.

When the advertisement of the advertiser located around the path of the means of transportation where the access point is installed is registered, the advertisement management system 102 may provide the advertisement of the advertiser located in a POI related to a search keyword among predetermined POIs around the path of the means of transportation. In addition, when the search keyword is related to a predetermined POI, the advertisement management system 102 may provide the advertisement of the advertiser located around the path from the means of transportation to the predetermined POI.

In operation S603, the advertisement management system 102 may collect the advertisement information in relation to the advertisement exposed on the doorway page.

For example, the advertisement management system 102 may collect at least one of business type information of the proprietor, ID information of the access point, geographical information of the access point, and an advertiser range for exposure of the advertisement. As another example, the advertisement management system 102 may collect at least one of a desired region for advertisement exposure, a desired proprietor for advertisement exposure, a unit price of an advertisement, and an advertising method, from the advertiser who intends to expose the advertisement through the doorway page.

In operation 604, the advertisement management system 102 may impose an advertisement charge in relation to the advertisement exposed through the user terminal provided with the wireless network service through the doorway page.

A case of exposing an advertisement through the doorway page and correspondingly providing the wireless network service that has been described with reference to FIGS. 5 and 6. However, the advertisement may be exposed through the search page and the wireless network service may be subsequently provided.

The exemplary embodiments according to the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts.

The respective units 201 to 204 of the network service providing system 101 and the respective units 205 to 208 of the advertisement management system 102 may belong to different systems as necessary.

It will be apparent to those skilled in the art that various modifications and variations can be made in the present invention without departing from the spirit or scope of the invention.

Thus, it is intended that the present invention cover the modifications and variations of this invention provided they come within the scope of the appended claims and their equivalents.

The invention claimed is:

1. A communication network service providing system, comprising:
    a connection request receiving unit to receive a wireless network connection request to a communication network from a mobile terminal via an access point of the communication network;
    a page providing unit to provide, in response to the wireless network connection request, the mobile terminal with a doorway page and a search page, at least one of the doorway page and the search page providing information data and being associated with the requested wireless network connection;

a terminal authentication unit to authenticate the mobile terminal requesting the network connection request when authentication information is provided by the mobile terminal in the doorway page; and a network service providing unit to provide the mobile terminal with a wireless communication network service associated with the wireless network connection when the authentication information provided by the mobile terminal is authenticated, wherein the doorway page is a starting page for the mobile terminal to connect with the requested wireless network connection, wherein the authentication information is provided to the mobile terminal locally without the mobile terminal obtaining the authentication information from the communication network, and wherein the information data provided on the doorway page and the search page comprises at least one of information data of a party managing the access point and information data of another party.

2. The network service providing system of claim 1, wherein the information data is an advertisement, and the page providing unit is configured to provide the terminal with an advertisement registered in an advertisement management system on the doorway page and the search page, according to at least one of a unit of an access point group and an installation location of the access point.

3. The network service providing system of claim 1, wherein the page providing unit is configured to provide, on the doorway page and the search page, at least one of information data related to a proprietor of a business place where the access point is installed and information data of another business located around the business place where the access point is installed.

4. The network service providing system of claim 3, wherein the page providing unit is configured to select a type of information data to provide on the doorway page and the search page by determining at least one of whether the wireless network connection request is received within business hours of the proprietor, whether the mobile terminal is located within a vicinity of the business place, and whether the mobile terminal is located around a plurality of proprietors.

5. The network service providing system of claim 1, wherein the page providing unit is configured to select a type of information data to provide on the doorway page and the search page of businesses located around a transportation path around which the access point is installed.

6. The network service providing system of claim 5, wherein at least one of the doorway page and the search page comprises a search area for receiving a search keyword from the mobile terminal, and wherein the page providing unit is configured to provide information data associated with a point of interest (POI) related to the search keyword among POIs located around the transportation path.

7. The network service providing system of claim 1, wherein the page providing unit is configured to provide the advertisement on the search page.

8. The network service providing system of claim 1, wherein the connection request receiving unit is configured to transmit a notification to notify the mobile terminal of availability of a wireless access to the communication network service, in response to the mobile terminal being located around the access point.

9. The network service providing system of claim 1, wherein the access point is configured to be installed in a vehicle assigned to travel on a predefined transportation path having a plurality of stations, and the information data provided on the at least one of the doorway and the search page corresponds to at least one of the plurality of stations selected by a user of the mobile terminal riding in the vehicle.

10. A communication network service providing method, comprising:

receiving a wireless network connection request to a communication network from a mobile terminal via an access point of the communication network;

providing, in response to the wireless network connection request, the mobile terminal with a doorway page and a search page, at least one of the doorway page and the search page displaying information data and being associated with the requested wireless network connection;

authenticating the mobile terminal requesting the network connection request when authentication information is provided by the mobile terminal in the doorway page; and providing the mobile terminal with a wireless communication network service in response to the authentication of the mobile terminal provided with at least one of the doorway page and the search page, wherein the doorway page is a starting page for the mobile terminal to connect to the requested wireless network connection, wherein the authentication information is provided to the mobile terminal locally without the mobile terminal obtaining the authentication information from the communication network, and wherein the information data provided on the doorway page and the search page comprises at least one of information data of a party managing the access point and information data of another party.

11. A non-transitory computer-readable recording medium storing a computer program comprising the steps of the method of claim 10.

\* \* \* \* \*